United States Patent
Massaro

(10) Patent No.: US 7,374,525 B2
(45) Date of Patent: May 20, 2008

(54) SCARA-TYPE ROBOTIC SYSTEM

(75) Inventor: Peter Massaro, Burlington, CT (US)

(73) Assignee: Protedyne Corporation, Windsor, CT (US)

( * ) Notice: Subject to any disclaimer, the term of this patent is extended or adjusted under 35 U.S.C. 154(b) by 0 days.

(21) Appl. No.: 11/339,036

(22) Filed: Jan. 25, 2006

(65) Prior Publication Data

US 2007/0173393 A1 Jul. 26, 2007

(51) Int. Cl.
*B23Q 3/157* (2006.01)

(52) U.S. Cl. .......................................... 483/16; 483/901

(58) Field of Classification Search .................. 483/16, 483/901, 54, 902, 900; 414/744.1, 744.3, 414/744.5; 74/490.01; 901/18, 14
See application file for complete search history.

(56) References Cited

U.S. PATENT DOCUMENTS

| | | | | |
|---|---|---|---|---|
| 4,084,709 | A * | 4/1978 | Buhrer | 414/744.3 |
| 4,392,776 | A | 7/1983 | Shum | |
| 4,399,718 | A * | 8/1983 | Zimmer | 901/18 |
| 4,527,934 | A | 7/1985 | Blaseck | |
| 4,921,395 | A * | 5/1990 | Sahlin | 414/744.3 |
| 5,017,083 | A * | 5/1991 | Sahlin | 414/744.3 |
| 5,178,512 | A * | 1/1993 | Skrobak | 414/744.5 |
| 5,492,443 | A | 2/1996 | Crorey et al. | |
| 5,538,373 | A * | 7/1996 | Kirkham | 409/131 |
| 5,901,936 | A * | 5/1999 | Bieg | 248/370 |
| 5,911,449 | A * | 6/1999 | Daniele et al. | 29/33 K |
| 6,032,343 | A * | 3/2000 | Blanch et al. | 29/33 R |
| 6,081,981 | A * | 7/2000 | Demarest et al. | 29/407.08 |
| 6,235,172 | B1 | 5/2001 | Begin et al. | |
| 6,285,098 | B1 * | 9/2001 | Nestler et al. | 901/41 |
| 6,354,167 | B1 | 3/2002 | Snow | |
| 6,491,491 | B1 | 12/2002 | Tsuneda et al. | |
| 6,575,676 | B2 * | 6/2003 | Wang et al. | 74/490.07 |
| 6,858,814 | B2 | 2/2005 | Fischer et al. | |
| 2002/0048505 | A1 * | 4/2002 | Tsuneda et al. | 414/744.1 |
| 2005/0234327 | A1 * | 10/2005 | Saracen et al. | 600/407 |
| 2005/0262959 | A1 * | 12/2005 | Angeles et al. | 74/490.01 |
| 2006/0099063 | A1 * | 5/2006 | Pietrantonio et al. | 414/744.5 |
| 2006/0210386 | A1 * | 9/2006 | Neutel | 414/744.3 |

FOREIGN PATENT DOCUMENTS

| | | |
|---|---|---|
| EP | 0913236 A | 5/1999 |
| JP | 1199780 A | 8/1989 |

(Continued)

OTHER PUBLICATIONS

International Search Report and Written Opinion for International Application No. PCT/US2007/001752 dated Jul. 24, 2007.

*Primary Examiner*—Dana Ross
(74) *Attorney, Agent, or Firm*—Wolf, Greenfield & Sacks, P.C.

(57) ABSTRACT

A robotic system including a rotatable turntable that has an arm pivotally mounted on the turntable for rotation about an axis displaced from the turntable's rotational axis. The arm's axis of rotation may be positioned nearer the turntable's axis of rotation than a bearing that supports the turntable on a base. The arm may have a portion that extends in a direction transverse to the arm's axis of rotation located below the turntable. The turntable may be supported on the base by a single bearing having portions located in a common plane.

22 Claims, 3 Drawing Sheets

FOREIGN PATENT DOCUMENTS

| | | |
|---|---|---|
| JP | 4013595 A | 1/1992 |
| JP | 5104462 A | 4/1993 |
| JP | 11070487 A | 3/1999 |
| JP | 2003266252 A | 9/2003 |
| JP | 2004304102 A | 10/2004 |
| JP | 2005150575 A | 6/2005 |

* cited by examiner

SCARA-TYPE ROBOTIC SYSTEM

BACKGROUND OF INVENTION

1. Field of the Invention

This invention relates to robotic systems.

2. Related Art

Robotic systems are widely used for manipulating objects and performing other tasks. One common type of robotic system includes a SCARA (Selective Compliance Assembly Robot Arm) system, such as that described in U.S. Pat. No. 6,491,491. For example, as shown in FIGS. 7-10 of U.S. Pat. No. 6,491,491, the robot includes a turntable 22 on which a transferring portion 3 having first and second arms 31 and 32 is pivotally mounted. The transferring portion 3 supports a hand portion 4 that, in this embodiment, is used to manipulate semiconductor wafers. The first arm 31 is rotatable about a first rotational axis 2$a$ that is offset from a rotational axis 1$a$ of the turntable 22.

SUMMARY OF INVENTION

The inventor has appreciated that for some applications, standard SCARA robot configurations do not provide suitable support for the robot arm. As a result, in some applications, it may be difficult to accurately and repeatedly position the robotic arm, particularly when the arm makes rapid movement and/or supports a relatively heavy mass.

In one aspect of the invention, a SCARA-type robot system may provide a robust support for the robotic arm with enhanced stiffness. In one embodiment, the robotic system may include a base and a turntable that is rotatable about a first axis relative to the base. The turntable may include a bearing that contacts the base at a location spaced a first distance from the first axis. An arm may be pivotally mounted to the turntable and be rotatable about a second axis that is spaced a second distance from the first axis that is less than the first distance. A coupling may be supported by the arm and be adapted to engage with a robotic tool, hand or other device arranged to perform at least one function, such as gripping, liquid sample handling, manipulation of an object, and so on. In accordance with this embodiment, by having the arm pivotally mounted at a point that is closer to the turntable's rotational axis than the bearing support, the turntable's ability to flex during movement of the turntable and/or arm may be reduced or eliminated. Thus, the stiffness of the support provided to the arm may be enhanced as compared to other similar systems. For example, in some embodiments, positioning the arm's rotational axis closer to the turntable's rotational axis than the bearing may eliminate the presence of a cantilevered portion of the turntable that supports the arm. Instead, the portion of the turntable that supports the arm may itself be effectively supported by two (or more) support points on the base that lie on opposite (diametrically opposed) sides of the arm and the turntable's axis of rotation.

In another aspect of the invention, a radially extending portion of an arm (e.g., forearm) of a SCARA-type robot may be located below a supporting turntable. For example, in one embodiment, a robotic system may include a base and a turntable that is rotatable about a first axis relative to the base. The turntable may include a bearing that contacts the base at a location spaced a first distance from the first axis. An arm may be pivotally mounted to the turntable and be rotatable about a second axis that is spaced from and parallel to the first axis. At least a portion of the arm, e.g., a radially extending portion that is perpendicular to the second axis, may be positioned below the bearing when the robot is in use. A coupling may be supported by the arm and be adapted to engage with a tool, hand or other device arranged to perform at least one function. The inverted configuration of the arm relative to the turntable and its support bearing(s) may allow the robot arm to be shortened, yet still be capable of manipulating objects in a relatively large work area positioned directly below the turntable's axis of rotation.

In another aspect of the invention, a SCARA-type robot may include only a single-bearing that supports a turntable relative to a base. For example, in one embodiment, a robot system may include a base and a turntable that is rotatable about a first axis relative to the base. A single bearing may support the turntable on the base in x, y, and z directions and for rotation of the turntable about the first axis. An arm may be pivotally mounted to the turntable and be rotatable about a second axis spaced from and parallel to the first axis. A coupling may be supported by the arm and be adapted to engage with a tool, hand or other device arranged to perform at least one function. By providing only a single bearing between the turntable and the base, the robot may be more easily assembled, and may allow for reduced tolerances in manufacture of the robot. In one embodiment, the bearing may have an annular or ring configuration that engages with the turntable near a periphery of the turntable.

These and other aspects of the invention will be apparent from the following description and claims.

BRIEF DESCRIPTION OF THE DRAWINGS

Aspects of the invention are described with reference to the following drawings in which numerals reference-like elements, and wherein.

DETAILED DESCRIPTION

Figure 1:
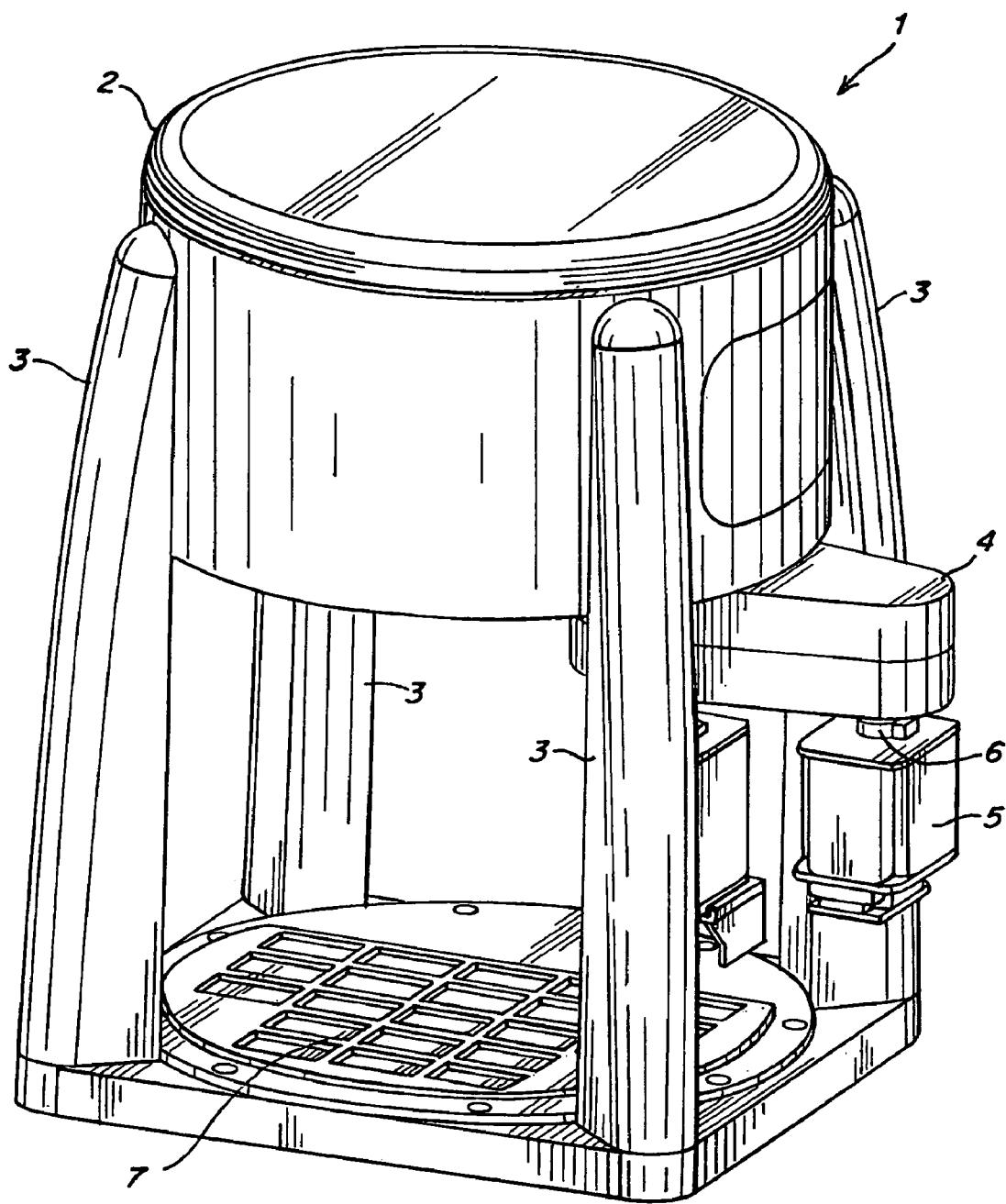
FIG. 1 is a perspective view of a robot system in accordance with aspects of the invention.

This invention is not limited in its applications to the details of construction and the arrangement of components set forth in the following description or illustrated in the drawings. The invention is capable of other embodiments and of being practiced or of being carried out in various ways. For example, illustrative embodiments of the invention are described below with reference to use in a liquid handling environment. However, it should be understood that aspects of the invention may be used in robotic systems for any suitable application.

FIG. 1 shows an illustrative embodiment of a robotic system 1 that includes a base 2 having one or more vertical legs 3 to support an upper portion of the base 2 above a work surface 7. The base 2 supports a turntable 8 (see FIG. 2) that is arranged for rotation about a generally vertical axis relative to the base 2. In accordance with one aspect of the invention, the turntable 8 has a pivotally mounted arm 4 with a portion positioned below the turntable 8. In this embodiment, the arm 4 has a radially-extending portion below the turntable 8, i.e., a portion extending in a direction transverse to an axis about which the arm may rotate relative to the turntable 8. Such an arrangement is not typically found with SCARA-type robots, in which an arm mounted to a turntable is typically located above the turntable. This inverted arrangement in accordance with an aspect of the invention may allow the arm 4 to effectively service a relatively large work surface 7 while having a relatively short radially-extending portion. That is, SCARA-type robots configured like that in U.S. Pat. No. 6,491,491 are arranged to engage with workpieces in a work area positioned around the turntable (e.g., an annular-shaped work area). In contrast, an arrangement like that in FIG. 1 is capable of operating in a circular-shaped work area below the turntable 8. Thus, robot configurations like that in U.S. Pat. No. 6,491,491 require a relatively longer forearm to be capable of interacting with a work surface of a given size as compared to a robotic system configured in accordance with this aspect of the invention.

The arm 4 may include a coupling 6 to removably engage with a tool 5 that is adapted to perform one or more functions, such as gripping, pipetting, or other material handling functions. The coupling 6 may be arranged to enable the arm 4 to drop a tool 5 and replace it with another tool 5, e.g., to perform a different function. The coupling 6 may engage with tools 5 in a vertical direction, i.e., the coupling 6 may be moved vertically to engage with or drop a tool 5, and may provide physical support for the tool as well as electrical and other connections for control and powering of the tool 5. However, the coupling 6 may provide a more permanent connection, prohibiting easy exchange of tools 5. By rotating the turntable 8, pivoting the arm 4 relative to the turntable, and/or extending the arm 4 in a vertical direction, the tool 5 may be manipulated to perform any suitable operations with respect to one or more work pieces on the work surface 7. For example, the work surface 7 in this illustrative embodiment includes a plurality of recessed areas in which one or more microtiter well plates or other sample holders may be positioned. Also, as shown in FIG. 1, the arm 4 may be movable such that the tool 5 may be positioned outside of the work surface 7. This may enable the tool 5 to be used to pick up or place objects positioned outside the work surface 7 or perform other desired operations, such as replacing one tool 5 for another.

Figure 2:
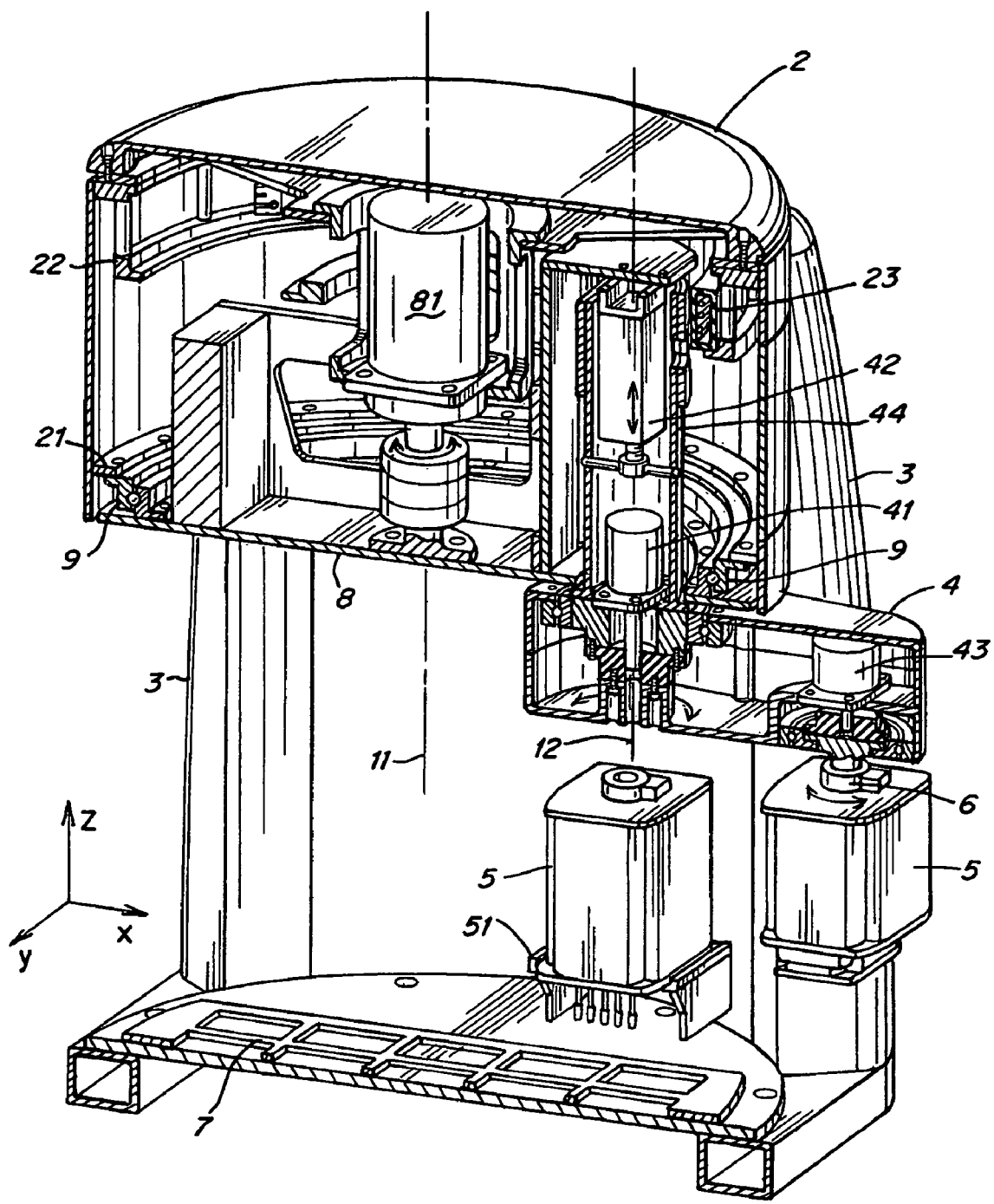
FIG. 2 is a cross-sectional view of the robotic system shown in FIG. 1.

In one aspect of the invention, an arm may be pivotally mounted to a turntable and be rotatable about an axis that is spaced from and generally parallel to an axis about which the turntable may be rotated. A distance between the arm's axis of rotation and the turntable's axis of rotation may be smaller than a distance between the turntable's axis of rotation and a bearing that supports the turntable on the base. As shown in FIG. 2, the turntable 8 may be rotatable about a generally vertical first axis 11 under the control of a turntable drive 81. The turntable drive 81 may include one or more motors, gears, transmissions, rotary encoders or other position detecting devices and so on. In short, the turntable drive 81 may include any suitable components to rotate the turntable 8 about the first axis 11 in a desired way. In this illustrative embodiment, the turntable 8 may be rotated about the first axis 11 with a high degree of positional control relative to the base 2. In addition, the arm 4 may be rotatable relative to the turntable 8 about a second axis 12 that is generally parallel to and spaced from the first axis 11. The arm 4 may be rotated about the second axis 12 by an arm rotation drive 41, which, like the turntable drive 81, may include any suitable components such as one or more motors, clutches, transmissions, position encoders, and so on.

As can be seen in FIG. 2, the second axis of rotation 12 is located nearer the first axis 11 than a bearing 9 which supports the turntable 8 on the base 2. In this illustrative embodiment, the bearing 9 includes a pair of hoop or ring-shaped races that are respectively joined to a flange 21 on the base 2 and near the periphery of the turntable 8. However, it should be understood that the bearing may include any number of parts and/or have separate sections, e.g., two or more arc-shaped sections that together support the turntable 8 relative to the base 2. In this embodiment, the bearing 9 supports the turntable in a horizontal plane (in x and y directions) and vertically (in the z direction) while also allowing the turntable 8 to be rotated about the first axis 11. By locating the second axis of rotation 12 nearer the first axis of rotation 11 than the bearing 9, the arm 4 may be very stiffly supported by the turntable 8. In conventional SCARA-type robotic systems, the axis of rotation of the arm is located at a point further away from the first axis of rotation 11 than one or more bearings used to support the turntable 8. (In this regard, the distance from the turntable's axis of rotation is a perpendicular distance from the axis.) As a result, a cantilevered portion of the turntable 8 is used to support the arm 4 in the conventional SCARA-type robots. This cantilevered arrangement in some cases may allow for unwanted flex or other movement of the cantilevered portion during movement of the arm and/or the turntable 8. In contrast, an embodiment in accordance with an aspect of the invention such as that shown in FIG. 2 may eliminate a cantilevered portion of the turntable that supports the arm 4. Instead, the portion of the turntable 8 that supports the arm 4 may be located between two opposed support points, e.g., portions of the bearing 9 that are diametrically opposed so that both the turntable's and the arm's axes of rotation are located between the bearing portions.

Another aspect of the invention illustrated in FIG. 2 is a robotic system in which the turntable is supported only by a single bearing with respect to the base. (By single bearing, it is meant that a single bearing assembly located in a common plane along the turntable's axis of rotation supports the turntable. A "single" bearing does not preclude the use of multiple bearing parts or sections that function together in a plane to support the turntable.) For example, in this illustrative embodiment, the bearing 9 alone is used to support the turntable 9 on the base 2. As mentioned above, the bearing 9 may support the turntable 8 in x, y and z directions, as well as allow for rotation of the turntable 8. Such an arrangement may allow for simplified assembly of the robot since only one bearing 9 need be mounted and aligned with respect to the base 2. In contrast, systems which require two (or more) bearings that are displaced axially along the turntable's axis of rotation may require more precise alignment in the relative mounting positions of the bearings on the base or excessive bearing wear may result. In this illustrative embodiment, the bearing 9 includes a pair of suitably arranged races that engage with each other via a plurality of spherical ball bearings positioned between the races. However, it should be understood that the bearing 9 may be arranged in other suitable ways. For example, the bearing 9 may, in fact, have two or more separate parts in some embodiments such as thrust-type bearing that is used to support the turntable in the z direction and a journal bearing that supports the turntable in the x-y plane.

In this illustrative embodiment, the arm 4 has an upper portion including a tube 44 that extends vertically through the bottom of the turntable 8 and above the bearing 9. However, the horizontal or radially extending portion of the arm 4 is always located below the bearing 9. The tube 44 is mounted to the turntable 8 so that the arm 4 may be moved vertically along the second axis 12. This may enable the arm 4 to move the tool 5 closer to and away from the work surface 7 as desired. The tube 44 may be moved vertically by a vertical arm drive 42 that may include one or more motors or other actuators, guideways, bearings or other arrangements to guide the motion of the tube 44 relative turntable 8, one or more linear encoders or other position detecting devices or other suitable components. For example, the vertical arm drive 42 may include a motor that drives a lead screw to rotate. A ball, nut or other arrangement engaged with the lead screw may drive the tube 44 to move vertically based on the rotation of the lead screw. Of course, those of skill in the art will appreciate that other drive arrangements are possible, such as linear motors, rack and pinion drive systems, and so on. The arm 4 may also include a tool drive system 43 that may be adapted to rotate and/or move the tool 5 vertically. The coupling 6, as is known in the art, may provide pneumatic, electrical, mechanical or other connection between the arm 4 and the tool 5. Replacement or other tools 5 may be located on a table 51 or other support and be located so that the arm 4 may be moved to drop and pick up alternate tools 5 as desired.

Figure 3:
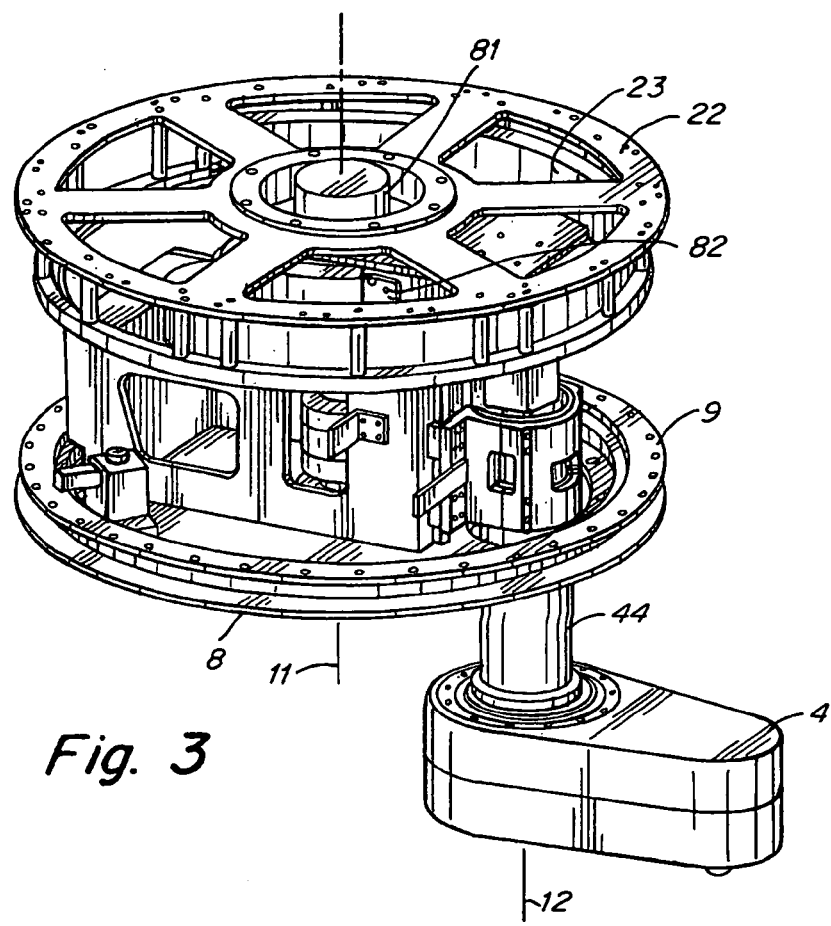
FIG. 3 is a top perspective view of a turntable and arm of the FIG. 1 robot system.
Figure 4:
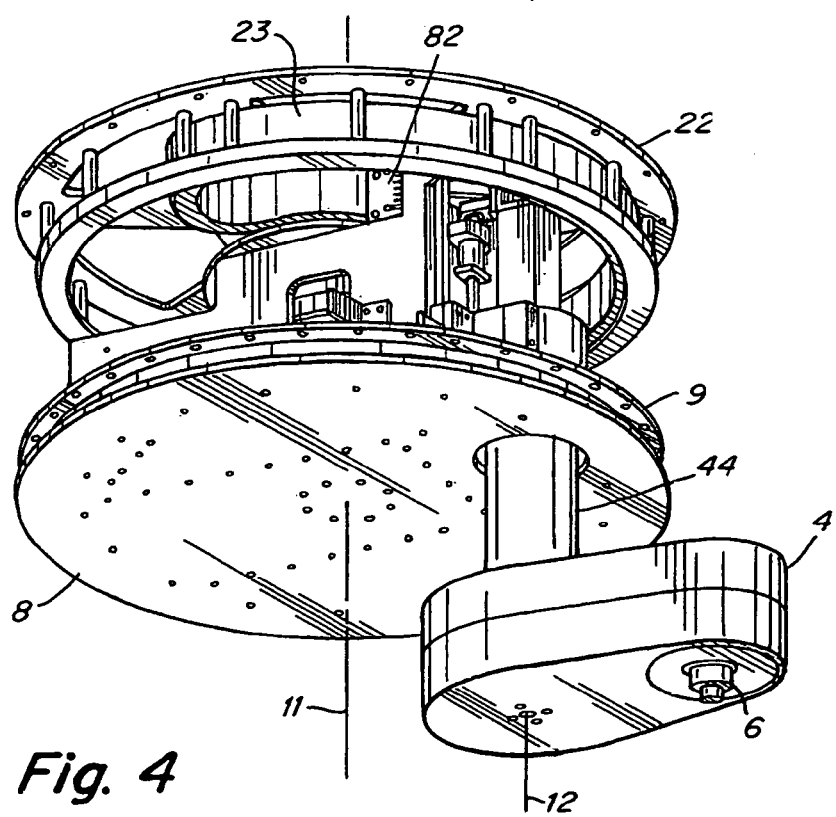
FIG. 4 is a bottom perspective view of the turntable and arm shown in FIG. 3.

FIGS. 3 and 4 show the turntable 8 and arm 4 in a configuration in which the arm 4 is extended away from the turntable 8 along the second axis 12. FIGS. 3 and 4 also show an upper support 22 that is fixed to the base 2 and provides physical support for the turntable drive 81. Also shown is a connector 23 that in this illustrative embodiment is arranged to provide pneumatic and electrical communication between the base 2 and the turntable 8. Such communication may be used to power the drives 41, 42 and/or 43, power various components in the tool 5, provide control signals to or from the robot components and so on. In this embodiment, the connector 23 is flexible such that the turntable 8 may be rotated relative to the upper support 22 while still maintaining electrical, pneumatic or other connection between the base 2 and the turntable 8. While the connector 23 remains fixedly attached to the turntable 8 at a connection point 82, the connector 23 may wrap around the upper portion of the turntable 8 as the turntable 8 rotates relative to the upper support 22. In this embodiment, the turntable 8 may be rotated through approximately 360 degrees or more. However, as will be appreciated by those of skill in the art, the turntable 8 in this illustrative embodiment is not capable of infinite rotation in a single direction. This is because the connector 23 has a finite length. Alternate embodiments may allow for infinite rotation of the turntable 8 relative to the upper support 22, such as by providing a slip ring or other joint that maintains desired electrical or other communication while allowing 360 degree rotation.

Another feature in accordance with an aspect of the invention is that many components of the robotic system 1 are located on top of the turntable 8. Also, the relatively large size of the turntable 8 provides a relatively large space on top of the turntable 8 for the various robotic components. This allows for easier assembly of the robotic system 1 since the location of the components on top of the turntable 8 allows for easier access by an assembler, while the relatively large space provided allows for more room for the assembler in which to work and the components to be placed without interference with other components.

It should be understood that various aspects of the invention described herein may be used alone or in conjunction with one or more other aspects of the invention. Thus, for example, aspects of the invention involving the use of a single bearing between the turntable and base of the robotic system may be used in arrangements in which the arm, or at least a portion of the arm that extends horizontally, is positioned above the turntable. Similarly, aspects of the invention are not limited by other aspects of the invention as described herein. For example, in embodiments in accordance with the aspect of the invention that involves positioning a rotation axis for the arm closer to the turntable axis than a bearing support may have the turntable supported on the base by two or more axially separated bearings (i.e., located in separate planes along the turntable's axis of rotation). Thus, this aspect of the invention is not limited to use with an inverted configuration (a radially extending arm portion located below the turntable) or with a single bearing.

Having described several aspects of this invention, it should be appreciated that various alterations, modifications and improvements will occur to those of skill in the art. Such alterations, modifications and improvements are intended to be part of this disclosure and are intended to be within the spirit and scope of the invention. Thus, the description and drawings herein are intended to be illustrative, not limiting.

The invention claimed is:

1. A robotic system comprising:
   a base;
   a turntable that is rotatable about a first axis relative to the base, the turntable including a bearing that contacts the base at a location spaced a first distance from the first axis;
   an arm pivotally mounted to the turntable that is rotatable about a second axis generally parallel to the first axis, the second axis being positioned a second distance from the first axis that is less than the first distance; and
   a coupling supported by the arm and adapted to engage with a tool arranged to perform at least one function,
   wherein the base includes an upper portion that is engaged with the turntable and at least one leg extending below the upper portion, the at least one leg being at least partially positioned below the turntable.

2. The system of claim 1, wherein at least a portion of the arm is positioned below the turntable during use.

3. The system of claim 1, wherein a portion of the arm extends in a direction transverse to the second axis.

4. The system of claim 1, wherein a tool engaged with the coupling is arranged to engage with a workpiece located below arm.

5. The system of claim 1, wherein the bearing includes an annular portion that engages with base.

6. The system of claim 1, wherein the arm is movable along the second axis.

7. The system of claim 1, wherein a portion of the arm extends above the bearing, and another portion of the arm is positioned below the bearing.

8. The system of claim 1, wherein the coupling is adapted to removably engage with a plurality of tools, each of the plurality of tools being adapted to perform a unique function as compared to other tools.

9. A robotic system comprising:
   a base;
   a turntable that is rotatable about first axis relative to the base, the turntable including a bearing that contacts the base at a location spaced a first distance from the first axis;
   an arm pivotally mounted to the turntable that is rotatable about a second axis spaced from and generally parallel to the first axis, at least a portion of the arm being positioned below the bearing when in use; and
   a coupling supported by the arm and adapted to engage with a tool arranged to perform at least one function,
   wherein the base includes an upper portion that supports the turntable and at least one leg extending below the upper portion, the at least one leg being at least partially positioned below the turntable.

10. The system of claim 9, wherein the second axis is spaced from the first axis at a second distance that is less than the first distance.

11. The system of claim 9, wherein at least a portion of the arm extends in a direction transverse to the second axis beyond the at least one leg.

12. The system of claim 9, wherein the base includes a plurality of legs extending below the upper portion and supporting the upper portion above a work area that is located below the turntable, the upper portion engaging the turntable at the bearing.

13. The system of claim 12, wherein the arm is movable along the second axis toward the work area such that a tool engaged with the coupling is operable with a workpiece located at the work area.

14. The system of claim 9, wherein a portion of the arm extends in a direction transverse to the second axis.

15. The system of claim 14, wherein the coupling is adapted to removably engage with a plurality of tools, each of the plurality of tools being adapted to perform a unique function as compared to other tools.

16. A robotic system comprising:
a base;
a turntable that is rotatable about first axis relative to the base;
a single bearing that supports the turntable on the base in x, y and z directions and for rotation about the first axis;
an arm pivotally mounted to the turntable that is rotatable about a second axis spaced from and generally parallel to the first axis; and
a coupling adapted to engage with a tool arranged to perform at least one function,
wherein the base includes an upper portion that engages with the turntable at the bearing, and at least one leg extending below the upper portion, the at least one leg being at least partially positioned below the turntable.

17. The system of claim 16, wherein the second axis is spaced from the first axis at a distance that is less than a minimum distance between the first axis and the bearing.

18. The system of claim 16, wherein at least a portion of the arm extends in a direction transverse to the second axis beyond the at least one leg.

19. The system of claim 16, wherein the base includes a plurality of legs extending below the upper portion and supporting the upper portion above a work area that is located below the turntable.

20. The system of claim 19, wherein the arm is movable along the second axis toward the work area such that a tool engaged with the coupling is operable with a workpiece located at the work area.

21. The system of claim 16, wherein the coupling is adapted to removably engage with a plurality of tools, each of the plurality of tools being adapted to perform a unique function as compared to other tools.

22. The system of claim 16, wherein at least a portion of the arm extends in a direction transverse to the second axis.

* * * * *